United States Patent

Lombard et al.

Patent Number: 6,019,062
Date of Patent: Feb. 1, 2000

[54] ANIMAL LITTER

[76] Inventors: Marsha M. Lombard; Robert G. Lombard, both of 1428 Oak St., Niles, Mich. 49120

[21] Appl. No.: 08/991,056

[22] Filed: Dec. 15, 1997

[51] Int. Cl.⁷ .................................................... A01K 1/015
[52] U.S. Cl. .............................................................. 119/172
[58] Field of Search ............................ 119/171, 172, 119/173

[56] References Cited

U.S. PATENT DOCUMENTS

| | | | |
|---|---|---|---|
| 3,059,615 | 10/1962 | Kuceski et al. | 119/173 |
| 4,117,804 | 10/1978 | Moore et al. | 119/166 |
| 4,355,117 | 10/1982 | Antrim et al. | 521/28 |
| 4,560,527 | 12/1985 | Harke et al. | 119/172 |
| 4,621,011 | 11/1986 | Fleischer et al. | 119/172 |
| 4,696,257 | 9/1987 | Neary et al. | 119/166 |
| 5,135,743 | 8/1992 | Stanislowski et al. | 119/171 |
| 5,143,023 | 9/1992 | Kuhns | 119/173 |
| 5,267,532 | 12/1993 | Franklin et al. | 119/173 |
| 5,303,676 | 4/1994 | Lawson | 119/173 |
| 5,371,054 | 12/1994 | Pluta et al. | 119/173 |
| 5,386,803 | 2/1995 | Hughes | 119/173 |
| 5,634,431 | 6/1997 | Reddy et al. | 119/173 |
| 5,638,770 | 6/1997 | Peleties | 119/173 |
| 5,647,300 | 7/1997 | Tucker | 119/172 |
| 5,775,259 | 7/1998 | Tucker | 119/172 |

*Primary Examiner*—Robert P. Swiatek
*Assistant Examiner*—Elizabeth Shaw
*Attorney, Agent, or Firm*—Chase & Yakimo, L.C.

[57] ABSTRACT

An improved litter for the accumulation of animal urine comprises a cellulosic base material which is impregnated with a pH-indicating solution to provide a visually detectable color transition at a particular pH level. Cellulosic material such as wastepaper, newsprint, cardboard, etc. can be used to form cellulosic particles that are light, absorbent, and relatively dust-free. In the preferred embodiment, cellulosic particles are impregnated with a pH indicator such as litmus which will undergo a color transition upon contact with animal urine, thus providing an indication that bacteria may be present. The color of the litter is changed from blue to red at each location of animal urination. This improved pH-sensitive litter, therefore, provides a cost-effective and environmentally safe means for pet owners to determine when animal litter needs to be changed.

2 Claims, 2 Drawing Sheets

ANIMAL LITTER

BACKGROUND OF THE INVENTION

This invention generally relates to animal litter and, more particularly, to an improved animal litter and method of manufacture having a chemical indicator for the detection of animal urine.

Waste from indoor pets causes a plurality of problems if not disposed of in a timely manner. While the mess and odor of pet feces and urine are obvious and readily apparent to the senses, other disadvantages associated with indoor pets are not so readily detectable or appreciated by pet owners. Pet waste, if not disposed of in a timely fashion, provides a source of bacteria and virus which may lead to serious health difficulties to the animal or human occupants of the household. Such bacteria is readily spread throughout the house as a pet uses a litter box and then walks throughout the house. A well-known difficulty experienced by owners of indoor pets is determining when to dispose of pet waste accumulated in a litter box, thereby reducing the spread of bacteria.

Pet litter boxes for collecting bodily waste from domesticated animals such as cats and indoor dogs are known. Litter compositions for agglomerating animal waste and/or minimizing animal waste odors are discussed in U.S. Pat. No. 5,143,023 to Kuhns. More particularly, Kuhns discloses a litter composition having a pH indicator that is chemically bound to a base material. Kuhns contemplates a clay base material and a method for chemically binding a chemical compound to the base material, the compound including a chemical indicator capable of providing a visual indication and a binding agent capable of agglomerating with surrounding base material. U.S. Pat. No. 3,059,615 to Kuceski discloses a litter comprised of an acidified cellulosic base material which may include a pH-sensitive additive capable of indicating when the litter needs to be changed. Acidifying the cellulosic base material requires adding particular amounts of toxic chemicals such as sulfuric acid, phosphoric acid, or hydrochloric acid to the base material. U.S. Pat. No. 5,371,054 to Pluta, et al suggests a litter having an uncalcined clay base of specific composition to which a pH indicator may be added. Another pH-sensitive litter is claimed in U.S. Pat. No. 5,267,532 having dual pH indicators that provide color transitions at problematically high or low pH levels of animal urine.

Although assumably effective in function, the known litters containing pH indicators are relatively complex in composition or production, thereby making them relatively expensive to pet owners. Also, such litters have failed to address that the release of ions from the base material upon contact with moisture may cause false pH readings. Moreover, pH-sensitive litters may be environmentally undesirable as they contain toxic chemicals. In addition, clay based litters are disadvantageous since they may be heavy, dusty, and of low absorbency. It is desirable, therefore, to have an animal litter comprising a cellulosic base material combined with a pH-indicating dye. The resulting litter is simple in both composition and production. It is also desirable to have a pH-indicating litter that is non-toxic and non-polluting both in production and final form. Therefore, it is desirable to have a pH-sensitive litter having a cellulosic base that provides a cost-effective means for owners of indoor pets to determine when to dispose of animal waste accumulated in a litter box, thereby reducing the spread of bacteria.

SUMMARY OF THE INVENTION

In response thereto we have invented an improved animal litter for indicating a change in pH caused by animal urine. More specifically, cellulosic particles are coated with a pH-indicating dye which provides a visual indication when the coated particles are encountered by animal urine. Litmus is the preferred pH indicator. Litmus is an organic substance derived from various species of lichens and is frequently used as an acid-base indicator. Recycled cellulosic waste materials may be used to produce the litter base particles. The environmental advantages of recycling waste paper products into a useful product should be noted.

In function, a litter box or cage may be filled with cellulosic particles that have been coated or impregnated with a pH-indicating dye such as litmus. The dye coated particles will change in color from blue to red when encountered by animal urine, an acidic substance within the range for which litmus provides a visually detectable indication. Thus, the pet owner is alerted that a particular area of litter has been saturated and is now a potential source for bacteria growth. Even if the pet attempts to cover its urination, the obvious color change will still be readily apparent to the pet owner. The pet owner may immediately remove the area of saturated litter, or alternatively, dispose of and replace the entire litter when approximately half of the litter has turned red. The litter is suitable for use with all indoor pets and is especially advantageous as litter or bedding for pets such as mice, hamsters, ferrets, weasels, etc.

It is therefore a general object of this invention to provide an improved animal litter that indicates to a pet owner when to dispose of the litter.

It is another object of this invention to provide an improved litter, as aforesaid, having cellulosic base material particles impregnated with a pH-indicating chemical, the base material not interfering with pH readings.

It is a further object of this invention to provide an improved litter, as aforesaid, that changes color upon encountering animal urine.

It is a still further object of this invention to provide an improved litter, as aforesaid, having a pH-sensitive chemical indicator, such as litmus, that is cost-effective for pet owners.

It is yet another object of this invention to provide a litter, as aforesaid, having a base material and pH-indicating chemical that is environmentally safe.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
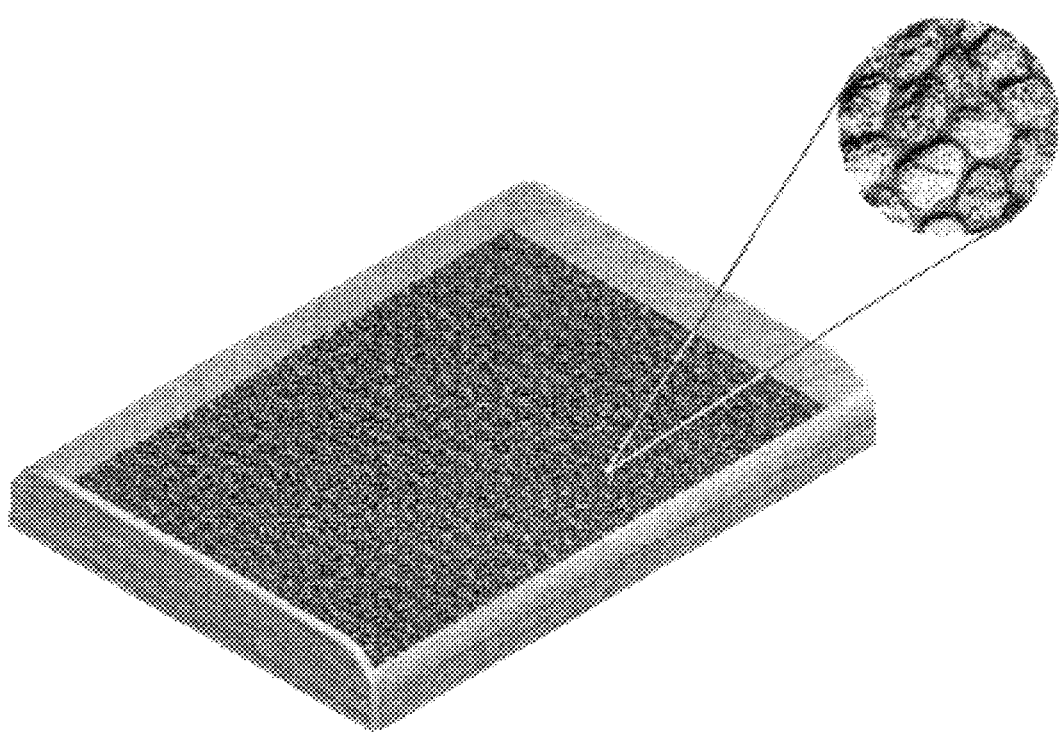
FIG. 1 shows an enlarged view of the litter made in accordance with the present invention.
Figure 2:
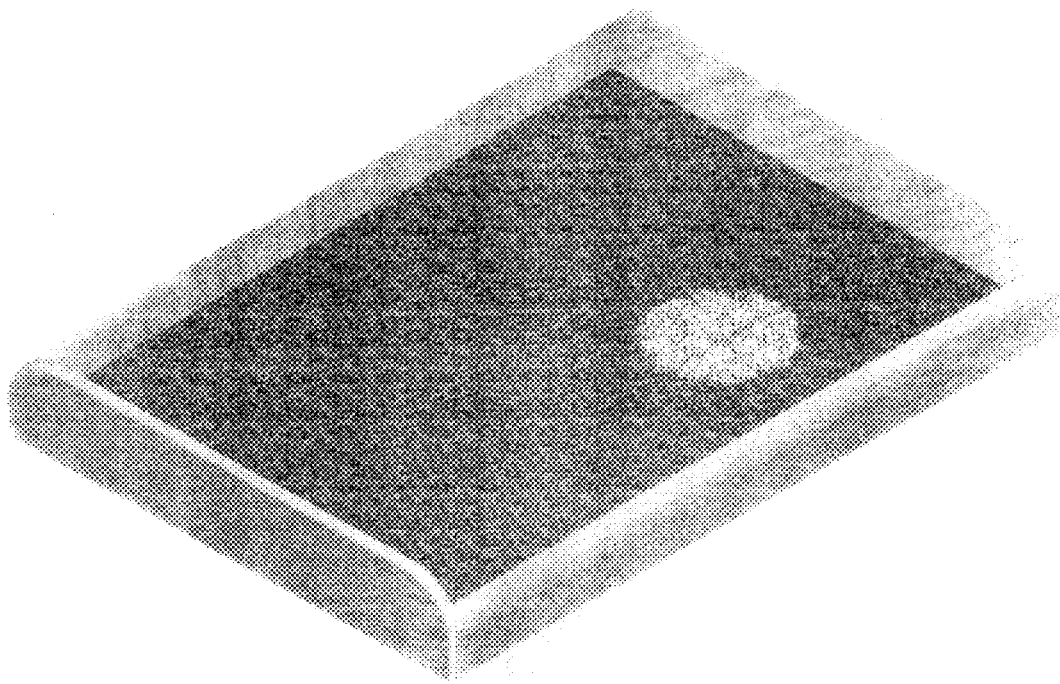
FIG. 2 illustrates the litter after pet urination thereon.

A pH-sensitive pet litter material is provided by coating or impregnating litter base particles with a pH indicator. The preferred base material for this invention is cellulosic particles which do not release ions upon saturation thereof. These particles may be produced from fibrous cellulosic waste materials such as waste paper, newsprint, cardboard, reclaimed paper mill cellulose fibers, etc. One method of forming such particles involves agglomerating a fibrous cellulosic feed material in the presence of water, compacting the surface of the agglomerated particles, and drying the particles.

Numerous pH-indicating dyes are known which are effective to provide a visual indication of pH changes within specific ranges. In the present invention, litmus is the preferred pH-indicating dye. Litmus is a partially water-soluble blue powder which changes from blue to red upon encountering a concentration of hydrogen ions characteristic of an acidic solution. Solubility is enhanced by using a one percent (1%) alcohol solution. One method of applying the litmus solution to the particle involves spraying atomized droplets of the solution directly onto a cascade of base particles as the particles fall through a chamber. The cellulosic particles absorb the dye as the dye droplets are coated onto individual fibers comprising the particles. The coated litter is then dried to secure the pH-indicating dye to the exterior surfaces of the fibers of the litter particles. It should be noted that the addition of dyes, binding agents, or acidifying agents are unnecessary to the objects of this invention.

Chemical indicators such as litmus change colors according to the concentration of hydrogen ions in the substance being contacted. Accordingly, the base material for the litter should be a material which when wetted does not release acid or base ions which would interfere with the pH reading of the animal urine. Color changes to the pH-indicating dye, therefore, will only result from an encounter between the dye and animal urine. Litmus is a good indicator of pH changes within the 5.0 to 8.0 range. The pH of animal urine is approximately 6.0. The pH dye-coated litter is placed in a litter box or cage. When the litter is sufficiently contacted by animal urine, the blue litmus dye will change to red as the change in hydrogen ion concentration provides a visual indication that an area of litter has been saturated and may be a source of bacteria growth.

Accordingly, the litter disclosed herein provides a visual means for determining when animal litter in a litter box or cage needs to be changed. The use of cellulosic base particles impregnated with a pH-indicating dye such as litmus make the litter both cost-effective for pet owners and safe for the environment.

It is to be understood that while a certain form of this invention has been illustrated and described, it is not limited thereto except insofar as such limitations are included in the following claims and allowable functional equivalents.

What is claimed is:

1. A litter for detection of animal urine comprising:
   a substrate of cellulose fibrous material resistant to ion exchange with a material in contact therewith, said material being other than an animal urine;
   a pH-indicating litmus agent free for absorption with said substrate in an ion free exchange relationship therebetween, said pH agent presenting a first color changeable to a second color only upon contact with urine of an animal.

2. A method of making animal litter indicative of contact with animal urine comprising the steps of:
   a. selecting a plurality of particles of a cellulose base material resistant to an ion exchange with materials in contact therewith, said materials other than animal urine;
   b. selecting a pH-indicating litmus agent for absorption with said particles;
   c. if required, placing said agent into a form suitable for spraying;
   d. atomizing said agent;
   e. cascading said particles between first and second positions;
   f. spraying said atomized agent on said cascading particles for absorption thereby;
   g. drying said particles, a contact of animal urine only with said dried particles displaying a color indicative of said contact.

* * * * *